United States Patent
Mahajan et al.

(10) Patent No.: US 12,328,428 B2
(45) Date of Patent: Jun. 10, 2025

(54) UPSCALE FILTERING OF VIDEO DATA

(71) Applicant: QUALCOMM Incorporated, San Diego, CA (US)

(72) Inventors: Vikrant Mahajan, Dinanagar (IN); Sandeep Nellikatte Srivatsa, Bangalore (IN); Ashish Mishra, Bhubaneswar (IN); Apoorva Nagarajan, Bangalore (IN); Divya Goswami, Delhi (IN)

(73) Assignee: QUALCOMM INCORPORATED, San Diego, CA (US)

( * ) Notice: Subject to any disclaimer, the term of this patent is extended or adjusted under 35 U.S.C. 154(b) by 119 days.

(21) Appl. No.: 18/069,076

(22) Filed: Dec. 20, 2022

(65) Prior Publication Data

US 2024/0214563 A1 Jun. 27, 2024

(51) Int. Cl.
*H04N 19/117* (2014.01)
*H04N 19/176* (2014.01)
*H04N 19/30* (2014.01)

(52) U.S. Cl.
CPC ......... *H04N 19/117* (2014.11); *H04N 19/176* (2014.11); *H04N 19/30* (2014.11)

(58) Field of Classification Search
CPC .... H04N 19/117; H04N 19/176; H04N 19/30; H04N 19/182; H04N 19/42; H04N 19/59; H04N 19/80
USPC ........................................................ 375/240
See application file for complete search history.

(56) References Cited

U.S. PATENT DOCUMENTS

| | | | |
|---|---|---|---|
| 10,779,276 B2 | 9/2020 | Ji et al. | |
| 2010/0111023 A1 | 5/2010 | Pelletier et al. | |
| 2013/0094568 A1 | 4/2013 | Hsu et al. | |
| 2015/0156486 A1* | 6/2015 | Miyoshi | H04N 19/66 375/240.02 |
| 2019/0394482 A1* | 12/2019 | Joshi | H04N 19/117 |
| 2020/0145658 A1 | 5/2020 | Chang et al. | |
| 2021/0297959 A1 | 9/2021 | Zhou et al. | |
| 2021/0337523 A1 | 10/2021 | Shen et al. | |
| 2022/0237741 A1 | 7/2022 | Yin et al. | |

FOREIGN PATENT DOCUMENTS

WO    2019237927 A1    12/2019

OTHER PUBLICATIONS

Correa M., et al., "AV1 and VVC Video Codecs: Overview on Complexity Reduction and Hardware Design", IEEE Open Journal of Circuits and Systems, IEEE, vol. 2, Sep. 13, 2021, pp. 564-576, XP011878048, Section II.F.

(Continued)

*Primary Examiner* — Susan E. Hodges
(74) *Attorney, Agent, or Firm* — Shumaker & Sieffert, P.A.

(57) ABSTRACT

A device for upscale filtering video data includes one or more processors configured to generate a number of upscaled pixels that is an integer multiple of one half of a size of a filter used to upscale filter the video data. The device may then store the remaining pixels to be used to upscale filter a subsequent, right-neighboring block. In this manner, the device may avoid generating upscaled pixels that will result in being unaligned with the block and that may not be output due to being unaligned.

34 Claims, 11 Drawing Sheets

(56) References Cited

OTHER PUBLICATIONS

El Mezeni D., et al., "Fast Guided Filter for Power-efficient Real-time 1080p Streaming Video Processing", Journal of Real-time Image Processing, Springer, DE, vol. 17, No. 3, Jul. 4, 2018, pp. 511-525, XP037160569, Paragraph [04.4].
International Search Report and Written Opinion—PCT/US2023/081588—ISA/EPO—Feb. 28, 2024.
Zummach E., et al., "Efficient Hardware Design for the AV1 CDEF Filter Targeting 4K UHD Videos", 2019 IEEE International Symposium on Circuits and Systems (ISCAS), IEEE, Oct. 12, 2020, 5 Pages, XP033933390, The Whole Document.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

\* cited by examiner

UPSCALE FILTERING OF VIDEO DATA

TECHNICAL FIELD

This disclosure relates to video coding, including video encoding and video decoding, and more particularly, to filtering video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for efficiently upscaling decoded video data. In some cases, captured video data may be downscaled prior to encoding, then upscaled following decoding, which may improve compression efficiency relative to encoding and decoding the full scale video data. Video data is typically processed in raster scan order, i.e., from left to right. Decoding and upscale filtering may be performed in parallel, such that after a block has been decoded, the block can be upscale filtered while other blocks are being decoded. This results in pixels of a right-neighboring block to the block not being available for use by the upscale filter. Thus, according to the techniques of this disclosure, the pixels of a block for which upscaling cannot be performed (e.g., a number of rightmost pixels corresponding to one half of the filter width) from the current block may be stored and used to upscale filter the remaining pixels of the block, along with pixels of the right-neighboring block. In this manner, the techniques of this disclosure may improve the efficiency of upscale filtering by avoiding generation of upscale pixels that are not aligned with the block width, and more accurately upscale filter a picture of video data.

In one example, a method of upscale filtering video data includes determining a filter scale value representing one half of a number of support pixels to be used by an upscale filter to upscale filter a block of video data; determining an upscale ratio for the block of video data; calculating a size multiple value as a product of the upscale ratio and a difference between the size of the block of video data and the filter scale value; calculating a rounded value from the size multiple value such that the rounded value is a largest integer multiple of the filter scale value that does not exceed the size multiple value; generating a number of upscaled pixels for each row of the block of video data that is equal to the rounded value, without generating upscaled pixels for a number of pixels from a right edge of the video block equal to a difference between a product of the size of the block and the upscale ratio and the rounded value; storing values for the number of pixels from the right edge of the video block of video data for each row of the block of video data; and using the stored values for the number of pixels from the right edge of the video block to upscale filter pixels of a right-neighboring block of video data to the block of video data.

In another example, a device for upscale filtering video data includes a memory configured to store video data; and one or more processors implemented in circuitry and configured to: determine a filter scale value representing one half of a number of support pixels to be used by an upscale filter to upscale filter a block of video data; determine an upscale ratio for the block of video data; calculate a size multiple value as a product of the upscale ratio and a difference between the size of the block of video data and the filter scale value; calculate a rounded value from the size multiple value such that the rounded value is a largest integer multiple of the filter scale value that does not exceed the size multiple value; generate a number of upscaled pixels for each row of the block of video data that is equal to the rounded value, without generating upscaled pixels for a number of pixels from a right edge of the video block equal to a difference between a product of the size of the block and the upscale ratio and the rounded value; store values for the number of pixels from the right edge of the video block of video data for each row of the block of video data; and use the stored values for the number of pixels from the right edge of the video block to upscale filter pixels of a right-neighboring block of video data to the block of video data.

In another example, a computer-readable storage medium has stored thereon instructions that, when executed, cause a processor to determine a filter scale value representing one half of a number of support pixels to be used by an upscale filter to upscale filter a block of video data; determine an upscale ratio for the block of video data; calculate a size multiple value as a product of the upscale ratio and a difference between the size of the block of video data and the filter scale value; calculate a rounded value from the size multiple value such that the rounded value is a largest integer multiple of the filter scale value that does not exceed the size multiple value; generate a number of upscaled pixels for each row of the block of video data that is equal to the rounded value, without generating upscaled pixels for a number of pixels from a right edge of the video block equal to a difference between a product of the size of the block and the upscale ratio and the rounded value; store values for the number of pixels from the right edge of the video block of video data for each row of the block of video data; and use the stored values for the number of pixels from the right edge of the video block to upscale filter pixels of a right-neighboring block of video data to the block of video data.

In another example, a device for upscale filtering video data includes means for determining a filter scale value representing one half of a number of support pixels to be used by an upscale filter to upscale filter a block of video data; means for determining an upscale ratio for the block of video data; means for calculating a size multiple value as a product of the upscale ratio and a difference between the size of the block of video data and the filter scale value; means for calculating a rounded value from the size multiple value such that the rounded value is a largest integer multiple of the filter scale value that does not exceed the size multiple value; means for generating a number of upscaled pixels for each row of the block of video data that is equal to the rounded value, without generating upscaled pixels for a number of pixels from a right edge of the video block equal to a difference between a product of the size of the block and the upscale ratio and the rounded value; means for storing values for the number of pixels from the right edge of the video block of video data for each row of the block of video data; and means for using the stored values for the number of pixels from the right edge of the video block to upscale filter pixels of a right-neighboring block of video data to the block of video data.

The details of one or more examples are set forth in the accompanying drawings and the description below. Other features, objects, and advantages will be apparent from the description, drawings, and claims.

DETAILED DESCRIPTION

Figure 1:
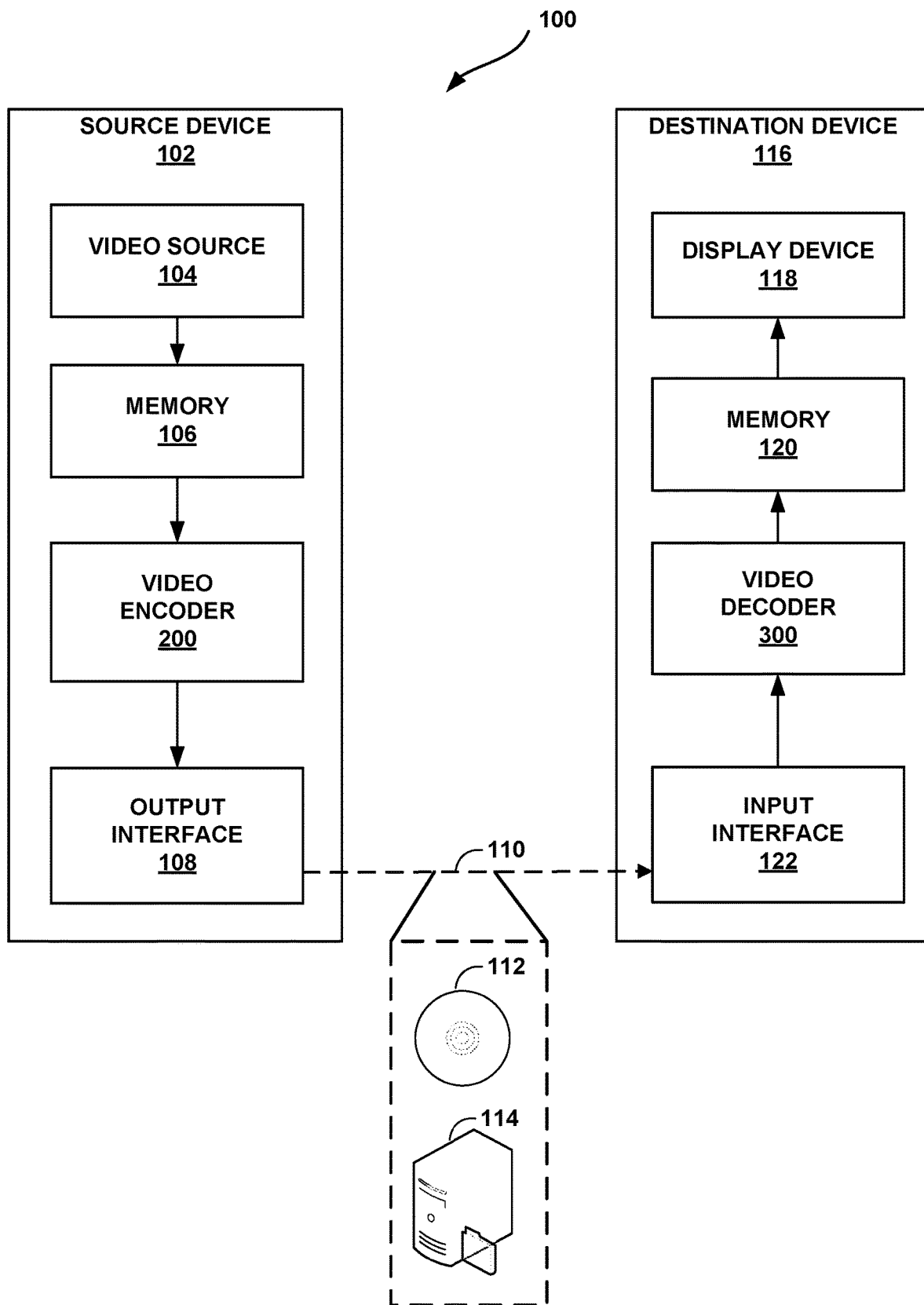
FIG. 1 is a block diagram illustrating an example video encoding and decoding system that may perform the techniques of this disclosure.

A video encoder (or pre-processing unit) may receive raw, uncoded video data to be encoded and apply a downscale filter to the received video data to spatially downscale the video data. After downscaling the video data, the video encoder may encode the downscaled video data. Likewise, a video decoder may decode the downscaled video data, then apply an upscale filter to the decoded video data to form upscaled video data. The upscale filter may be, for example, an eight-tap filter that uses the values of a current pixel, three pixels to the left of the current pixel, and four pixels to the right of the current pixel to form one or more upscaled pixels. The number of upscaled pixels may correspond to an upscale ratio, which may be, for example, 1.125, 1.25, 1.375, 1.5, 1.625, 1.75, 1.875, 2, or other values within this range or greater than two.

The video decoder (or a post-processing unit) may perform upscale filtering in parallel with the decoding, such that only samples of a current block and left-neighboring blocks are available for upscale filtering. Thus, the video decoder may avoid generating upscaled pixels for right-most pixels of the block that would need access to pixels of a right-neighboring block.

Additionally, rather than generating upscaled pixels that are not aligned with a block width, the techniques of this disclosure include generating upscaled pixels that are aligned with the block width. That is, the number of generated upscaled pixels for a current block may be a multiple of half of the filter width. Upscaled pixels for the remaining pixels of the current block may be generated while generating upscaled pixels for a subsequent block in the same row as the current block. In order to generate the upscaled pixels for the remaining pixels, a number of unfiltered pixel values of the current block may be stored for reference by the upscale filter, where the number may be, e.g., one less than half of the filter width.

Thus, for example, the filter may be an 8-tap filter having 8 support pixels, including three pixels to the left of a current pixel, the current pixel, and four pixels to the right of the current pixel. As such, the values of the three pixels to the left of the four rightmost pixels of the current block would be stored, along with the four rightmost pixels, such that the four rightmost pixels can be upscale filtered while also filtering the right-neighboring block to the current block. While the techniques of this disclosure are described with respect to an 8-tap filter, these techniques may also be applied to filters of other sizes, such as 16-tap, 32-tap, or the like.

In this manner, the techniques of this disclosure may improve the efficiency of upscale filtering video data. Heuristic testing of these techniques on 4K video data has shown performance increases across all tested upscale ratios, ranging from 6.67% to 11% improvements, as summarized in Table 1 below:

TABLE 1

| Upscale Ratio | Performance Increase |
| --- | --- |
| 1.125 | 11% |
| 1.25 | 10% |
| 1.375 | 9.09% |
| 1.5 | 8.33% |
| 1.625 | 7.69% |
| 1.75 | 7.14% |
| 1.875 | 6.67% |

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for upscale filtering video data. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for upscale filtering video data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that upscale filter video data.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, after video data has been decoded (i.e., reproduced), either by video encoder 200 or video decoder 300, video encoder 200 and video decoder 300 may upscale filter the decoded video data according to the techniques of this disclosure. The techniques of this disclosure are described primarily with respect to video decoder 300, although it should be understood that video encoder 200 may also perform these techniques following decoding/reproduction of video data.

After decoding a block of video data, video decoder 300 may begin decoding a right-neighboring block to the block, and also upscale filter the decoded block of video data according to the techniques of this disclosure. Alternatively, a post-processing unit (not shown in FIG. 1) may receive decoded blocks from video decoder 300 and perform the upscale filtering process described in this disclosure.

The upscale filter may be an 8-tap filter, i.e., may use eight support pixels to generate one or more upscaled pixels (which may also include modifying values of one or more of the support pixels). Thus, when upscale filtering pixels of a current block, the upscale filter may avoid generating upscale filtered pixels for the rightmost four pixels of the current block (i.e., a number of pixels equal to one half of the filter width). Because the three pixels to the left of these four rightmost pixels will be needed to upscale filter the remaining four rightmost pixels, all seven of these pixels may be stored for later use when the right neighboring block is ready to be upscale filtered.

Figure 2A:
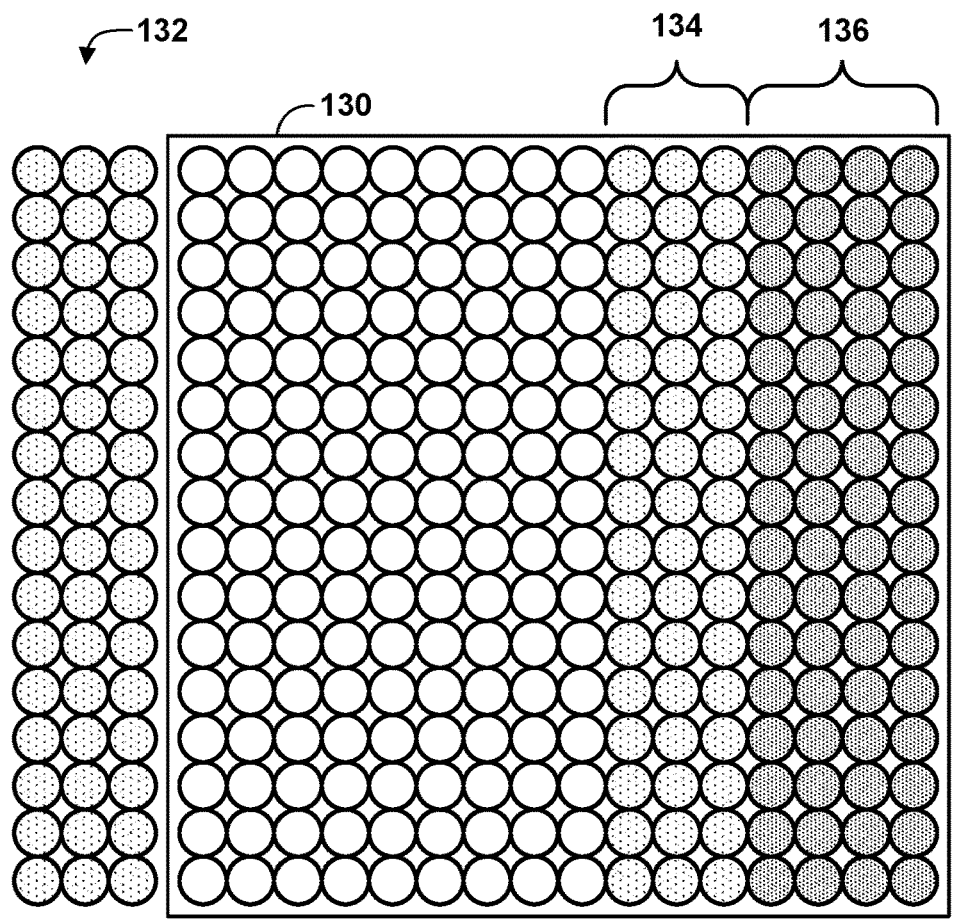
FIGS. 2A and 2B are conceptual diagrams illustrating pixels that can be used when upscale filtering a block of video data.
Figure 2B:
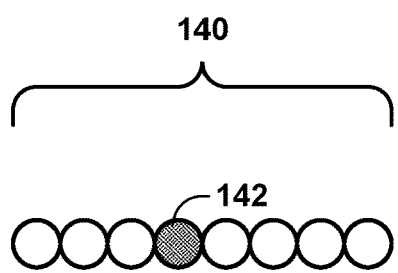

FIGS. 2A and 2B are conceptual diagrams illustrating pixels that can be used when upscale filtering a block of video data. FIG. 2A depicts block 130 including 16×16 pixels to be horizontally upscaled. The white, unshaded pixels of block 130 can be upscaled using left neighboring pixels 132, the white pixels themselves, pixels to be stored 134, and unfiltered pixels 136. Unfiltered pixels 136 are not filtered along with the other pixels of block 130 because pixels of a right-neighboring block are not necessarily available. Therefore, unfiltered pixels 136 and pixels to be stored 134 may be stored to be used to filter unfiltered pixels 136, along with pixels of a right-neighboring block (not shown) to block 130 after the right-neighboring block has been decoded.

FIG. 2B depicts support pixels 140 used for an 8-tap upscale filter, including central pixel 142 (also referred to as a "current pixel"). The 8-tap upscale filter may be used to form one or more output pixels, including central pixel 142 and the other pixels shown in FIG. 2B, namely three left neighbor pixels and four right neighbor pixels. Video coding and filtering standards, such as AOMedia Video 1 (AV1), support various upscaling ratios, such as 1.125, 1.25, 1.375, 1.5, 1.625, 1.75, 1.875, and 2. Upscale output may be generated in a 4×4 pixel format, as loop filter parameters may be defined at the 4×4 level. As a result, the last four columns of pixels (unfiltered pixels 136 if FIG. 2A, for example), are not filtered until after a right-neighboring block is decoded and available for reference.

The following equations may be used for the upscale filter:

A horizontal (X position) shift in the input pixel domain for one pixel shift in output:

$$stepX = (DWwidth << 16) + (UPwidth/2))/UPwidth$$

An X-position in the input pixel domain to generate a first output pixel:

$$initialSubpelX = (-((UPwidth - DWwidth) << 15)) + UPwidth/2)/UPwidth$$

$$srcX = -(1 << 16) + initialSubpelX + i*stepX$$

A central pixel location:

$$srcXPx = (srcX >> 16)$$

The upscale filtering equation:

$$y(i) = \Sigma_{m=-3 \text{ to } 4} \text{filter}_{coeff(m)} * x(srcXPx + m)$$

Figure 3:
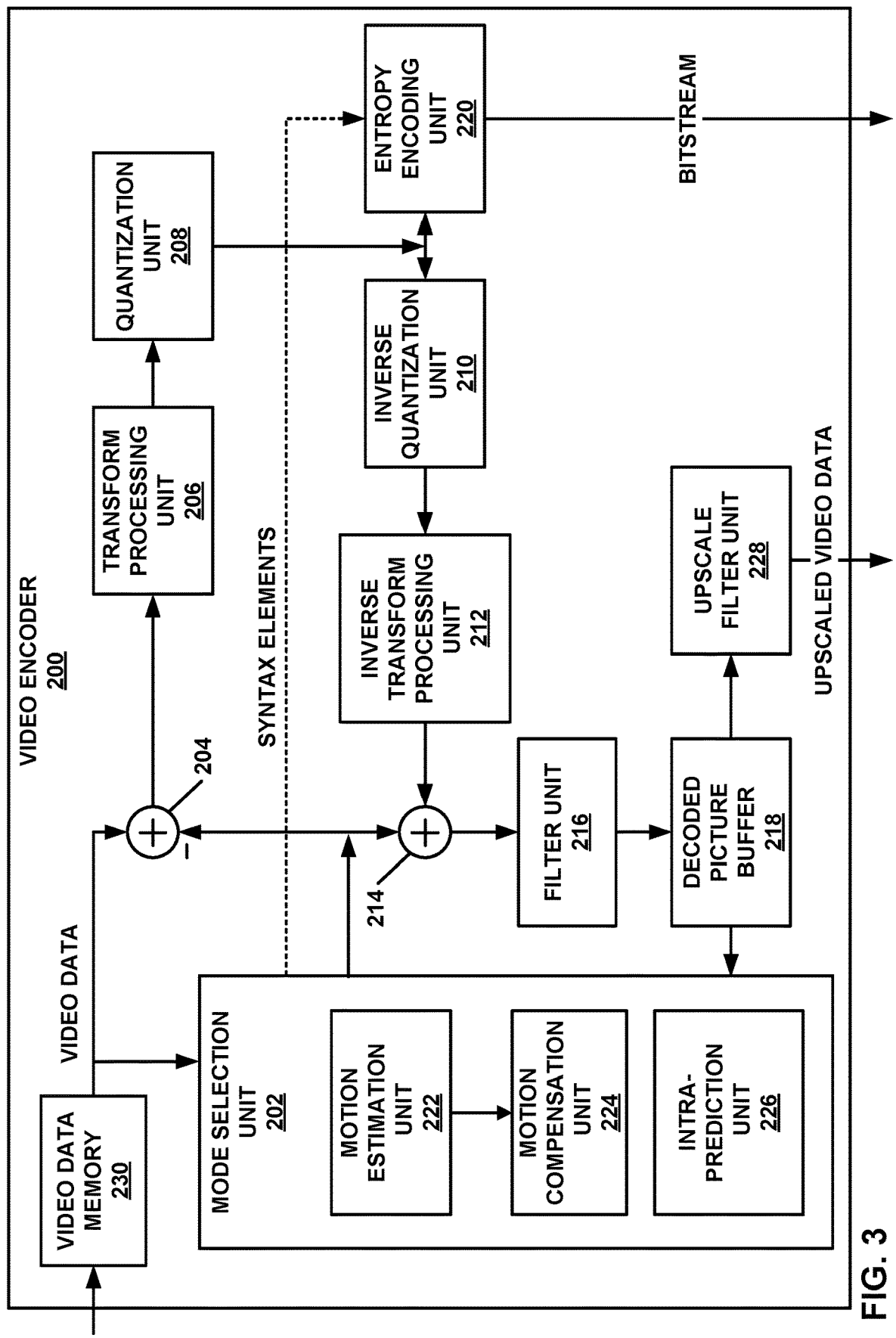
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, entropy encoding unit 220, and upscale filter unit 228. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, entropy encoding unit 220, and upscale filter unit 228 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 also includes upscale filter unit 228. Upscale filter unit 228 represents a post-loop filter that may perform the techniques of this disclosure to upscale filter decoded video data. Although depicted as part of video encoder 200, in some examples, upscale filter unit 228 may form part of a separate post-processing. In addition, a pre-processing unit (not shown) may initially downscale video data prior to storing the downscaled video data in video data memory 230.

Figure 4:
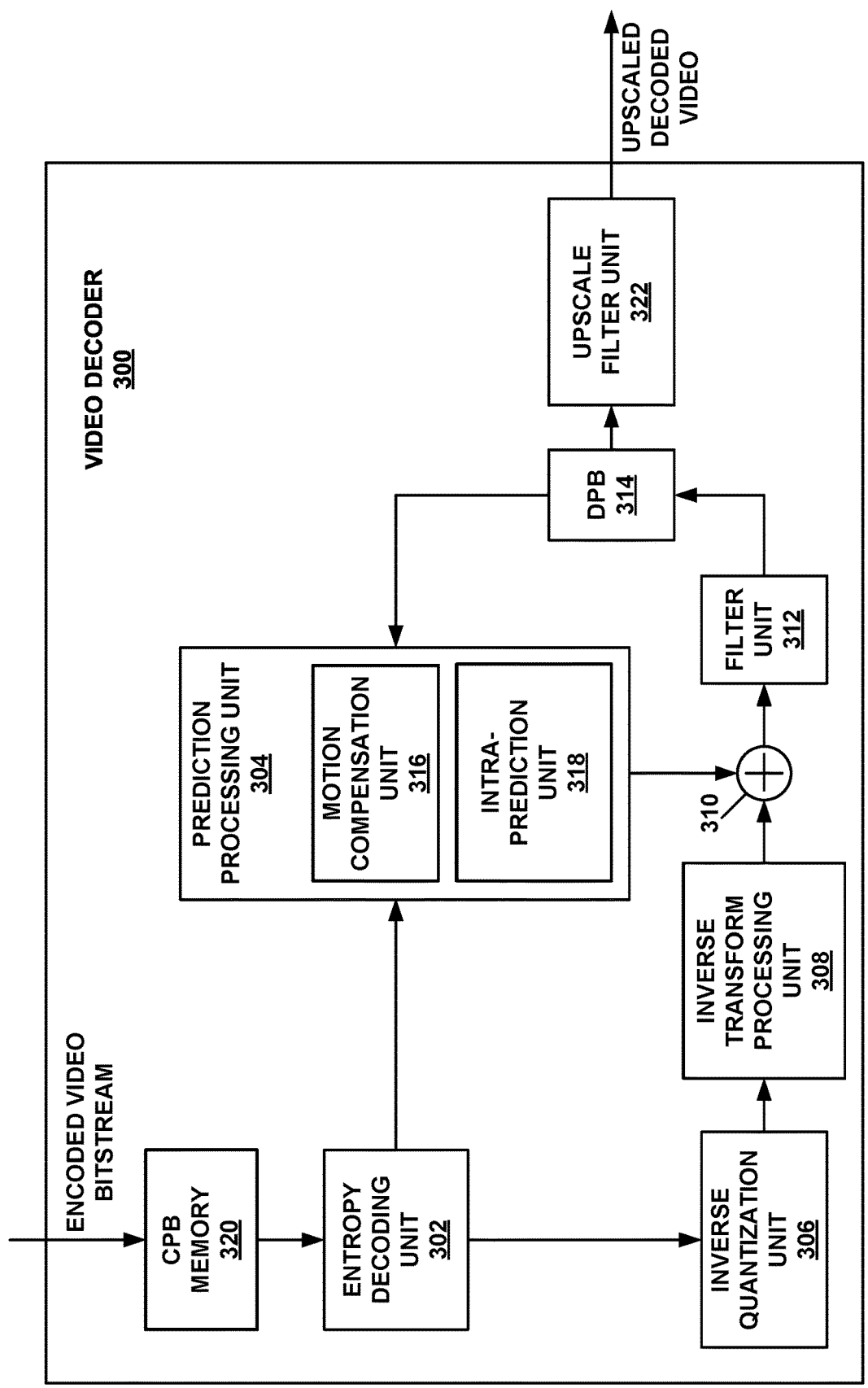
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, decoded picture buffer (DPB) 314, and upscale filter unit 322. Any or all of CPB memory 320, entropy decoding unit 302, prediction processing unit 304, inverse quantization unit 306, inverse transform processing unit 308, reconstruction unit 310, filter unit 312, DPB 314, and upscale filter unit 322 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Video decoder 300 further includes upscale filter unit 322. Upscale filter unit 322 may perform the techniques of this disclosure, as discussed in greater detail below, to horizontally upscale decoded video data. In some examples, upscale filter unit 322 may instead form part of a separate post-processing unit (not shown).

In this manner, video decoder 300 represents an example of a device for upscale filtering video data including a memory configured to store video data; and one or more processors implemented in circuitry and configured to: determine a filter scale value representing one half of a number of support pixels to be used by an upscale filter to upscale filter a block of video data; determine an upscale ratio for the block of video data; calculate a size multiple value as a product of the upscale ratio and a difference between the size of the block of video data and the filter scale value; calculate a rounded value from the size multiple value such that the rounded value is a largest integer multiple of the filter scale value that does not exceed the size multiple value; generate a number of upscaled pixels for each row of the block of video data that is equal to the rounded value, without generating upscaled pixels for a number of pixels from a right edge of the video block equal to a difference between a product of the size of the block and the upscale ratio and the rounded value; store values for the number of pixels from the right edge of the video block of video data for each row of the block of video data; and use the stored values for the number of pixels from the right edge of the video block to upscale filter pixels of a right-neighboring block of video data to the block of video data.

Figure 5:
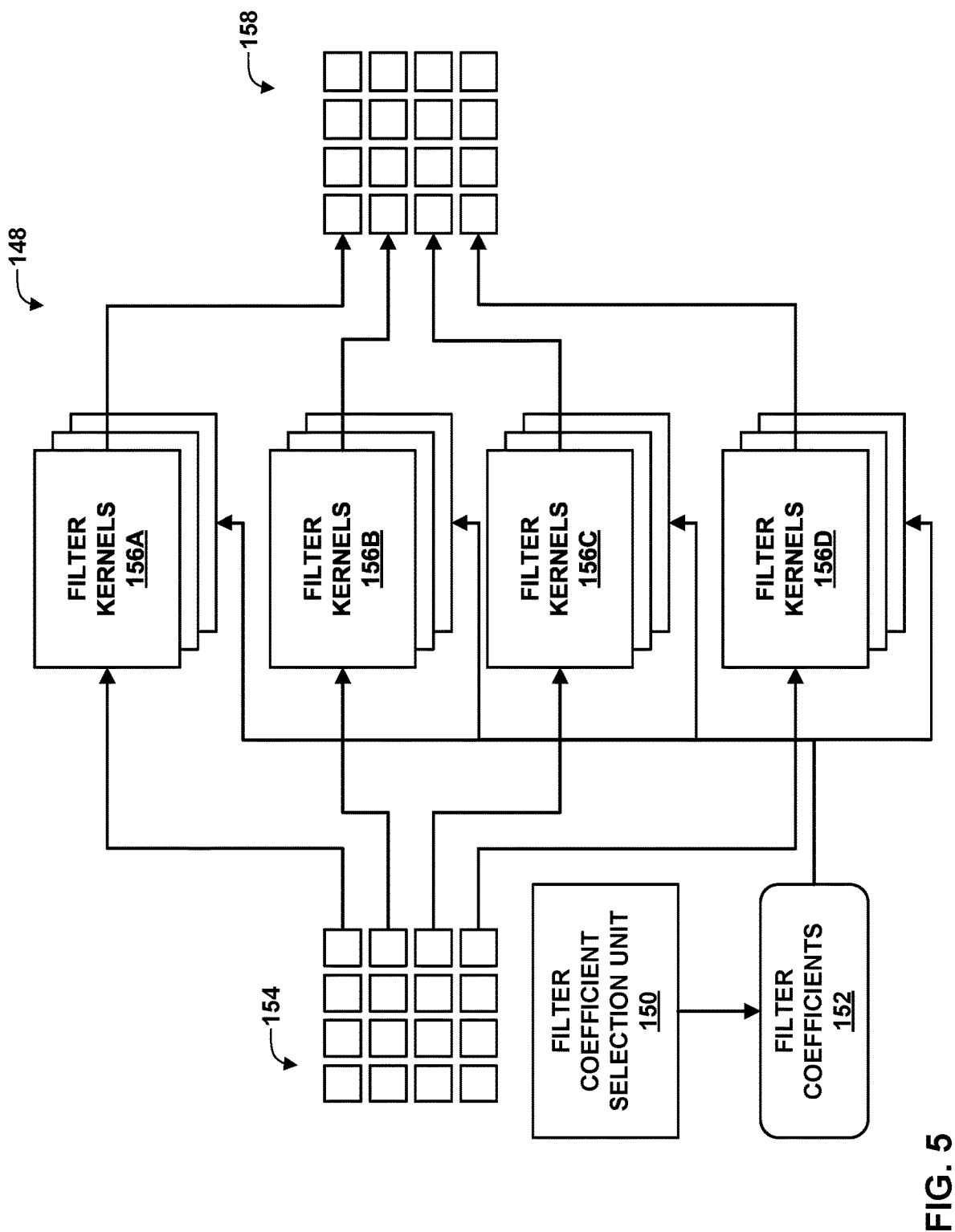
FIG. 5 is a block diagram illustrating an example set of components that may be included in an upscale filter unit.

FIG. 5 is a block diagram illustrating an example set of components of upscale filter unit 148. Upscale filter unit 228 of FIG. 3 and/or upscale filter unit 322 of FIG. 4 may include components similar to those of upscale filter unit 148. In this example, the components of upscale filter unit 148 include filter coefficient selection unit 150, filter coefficients 152, and various sets of filter kernels 156A-156D (filter kernels 156). Input pixels 154 are provided to filter kernels 156, which apply the respective filter coefficients to form upscaled pixels 158. Filter kernels 156 may operate in parallel on input pixels 154 to generate upscaled pixels 158.

Figure 6A:
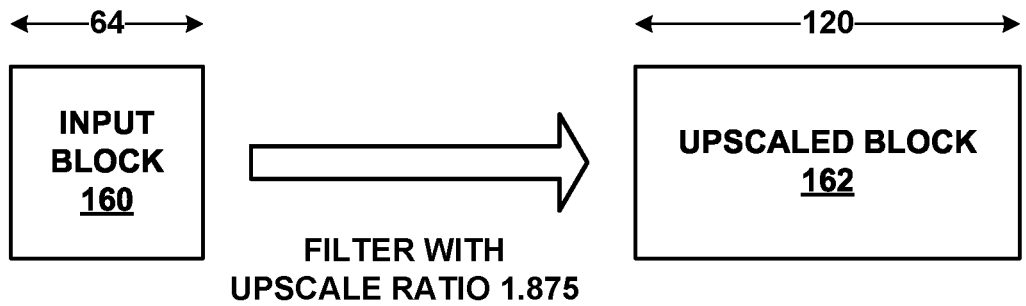
FIGS. 6A and 6B are conceptual diagrams illustrating examples of input blocks of video data and corresponding upscaled blocks resulting from upscale filtering.
Figure 6B:
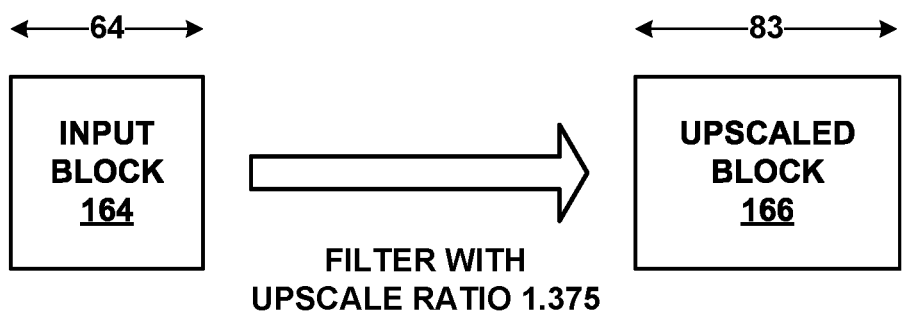

FIGS. 6A and 6B are conceptual diagrams illustrating examples of input blocks of video data and corresponding upscaled blocks resulting from upscale filtering. In particular, FIG. 6A depicts an example of input block 160, which is a 64×64 pixel block, filtered by an upscale filter with upscale ratio 1.875, to generate upscaled block 162, which is a 120×64 pixel block. That is, only the first 60 pixels are upscale filtered, resulting in 120 upscale filtered pixels. FIG. 6B depicts an example of input block 164, which is a 64×64 pixel block, filtered by an upscale filter with upscale ratio 1.375, to generate upscaled block 166, which is an 83×64 pixel block. That is, only the first 60 pixels are upscale filtered, resulting in 83 upscale filtered pixels.

The examples of FIGS. 6A and 6B correspond to a conventional upscale architecture implementation, which uses superblocks (SBs), which in AV1, can be 64×64 or 128×128. In this conventional approach, all possible pixels in a current SB are upscale filtered, irrespective of whether the upscaled SB width is a multiple of 4 or not.

For a 64×64 pixel SB, 60 pixel columns of the current SB are used as central pixels for upscale filtered. The last four pixels are not used, as the right neighbor data is not necessarily available for those pixels. Similarly, for a 128×128 pixel SB, only the first 124 pixel columns of the current SB are used as central pixels for upscaling.

For upscale ratios other than 2, this approach can result in unaligned output generation (that is, the output upscale width is not aligned to 4 pixels). For a 4K width input frame with an upscaling ratio of 1.375, and an input block of 64 pixels, only the first 60 pixels are filtered as central pixels, resulting in an output block of 83 samples wide, which is not a multiple of 4.

As the upscale hardware may contain multiple kernels (e.g., 16 kernels to process all pixels of a 4×4 block in parallel), if the output generated is not aligned to 4-pixel width, all kernels will not be fully utilized, leading to a loss of performance.

If a frame (picture) of video data has each SB column as a tile, there can be unaligned output generation (that is, output upscale width not being aligned to 4 pixels) after upscaling the first SB, which is not sent out on the output interface. In that case, the remaining pixels for the 4×4 block would be generated while processing the next SB. Due to this constraint, 4×4 blocks generated using the SB boundary pixels would require double the amount of clock cycles compared to other 4×4 blocks, leading to performance degradation. For 4K width downscaled frames having each SB column as a tile and upscaling ratio of 1.375, pixel columns 81 to 83 and pixel column 84 are generated in separate clock cycles, leading to performance degradation.

Additional processing logic is also used to align the next SB output, depending upon the number of unaligned pixels (1, 2, or 3) in the previous SB. Thus, in these conventional techniques, anywhere from 7 to 10 lines would need to be stored between blocks. The variable nature of the number of lines to be stored increases logic demands and decreases performance relative to the techniques of this disclosure.

Assuming each 4×4 block takes n cycles for processing:

$$\text{Downscale width, } DWwidth$$

$$\text{Upscale width, } UPwidth = DWwidth * UpscaleRatio$$

$$\text{No. of SB blocks in luma frame width} = NumSB = DWwidth/SBWidth$$

$$\text{No. of SB block boundaries} = (NumSB - 1) = (DWwidth/SBWidth - 1)$$

$$\text{No. of } 4 \times 4 \text{ in luma frame height} = FrameHeight/4$$

$$\text{No. of luma } 4 \times 4 \text{ at SB Boundaries} = (NumSB - 1) * FrameHeight/4 =$$

$$((DWwidth * UpscaleRatio)/SBWidth - 1) * FrameHeight/4$$

No. of 4×4 in luma frame width =

$$UPwidth/4 = (DWwidth * UpscaleRatio)/4$$

Total luma 4×4 blocks =

$$NumLuma = (DWwidth * UpscaleRatio)/4 * FrameHeight/4$$

Total cycles taken for luma processing =

$$\left(\frac{(DWwidth * UpscaleRatio)}{4} * \frac{FrameHeight}{4}\right) * n +$$
$$\left(\left(\frac{DWwidth}{SBWidth} - 1\right) * \frac{FrameHeight}{4}\right) * n$$

Total cycles taken for chroma processing =

$$\left(\frac{(DWwidth * UpscaleRatio)}{8} * \frac{FrameHeight}{8}\right) * n +$$
$$\left(\left(\frac{DWwidth}{SBWidth} - 1\right) * \frac{FrameHeight}{8}\right) * n$$

Total cycles taken for frame processing =

$$\left(\frac{3 * (DWwidth * UpscaleRatio)}{8} * \frac{FrameHeight}{4}\right) * n +$$
$$\left(\left(\frac{DWwidth}{SBWidth} - 1\right) * \frac{FrameHeight}{2}\right) * n$$

Figure 7:
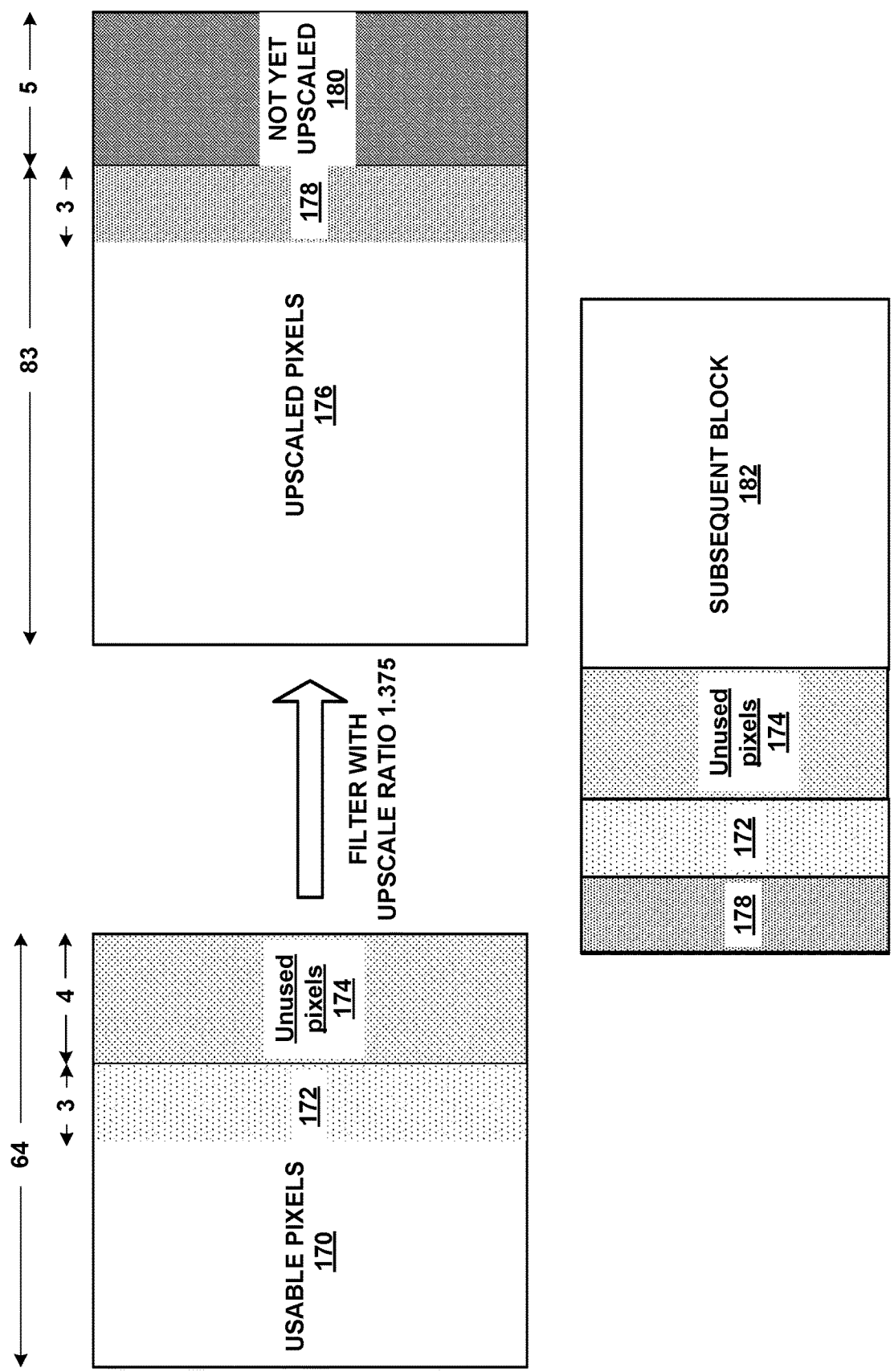
FIG. 7 is a conceptual diagram illustrating one technique for upscale filtering a block of video data.

FIG. 7 is a conceptual diagram illustrating an example of one conventional technique for upscale filtering a block of video data. In this example, a 64×64 block includes 60 columns of usable pixels 170 that may be upscaled via a filter with upscale ratio 1.375 to form 38 upscaled pixels 176. For a 64 pixel block, the ultimate goal is to form 88 upscaled pixels, thus in this example, 5 columns of not yet upscaled pixels would remain. In order to form upscaled pixels for not yet upscaled pixels 180, three columns of upscaled, unaligned pixels 178 would need to be saved, as well as three columns of original neighbor pixels 172 to unused pixels 174, as well as unused pixels 174 themselves, for a total of ten columns of saved pixels to be upscale filtered, along with subsequent block 182.

Figure 8:
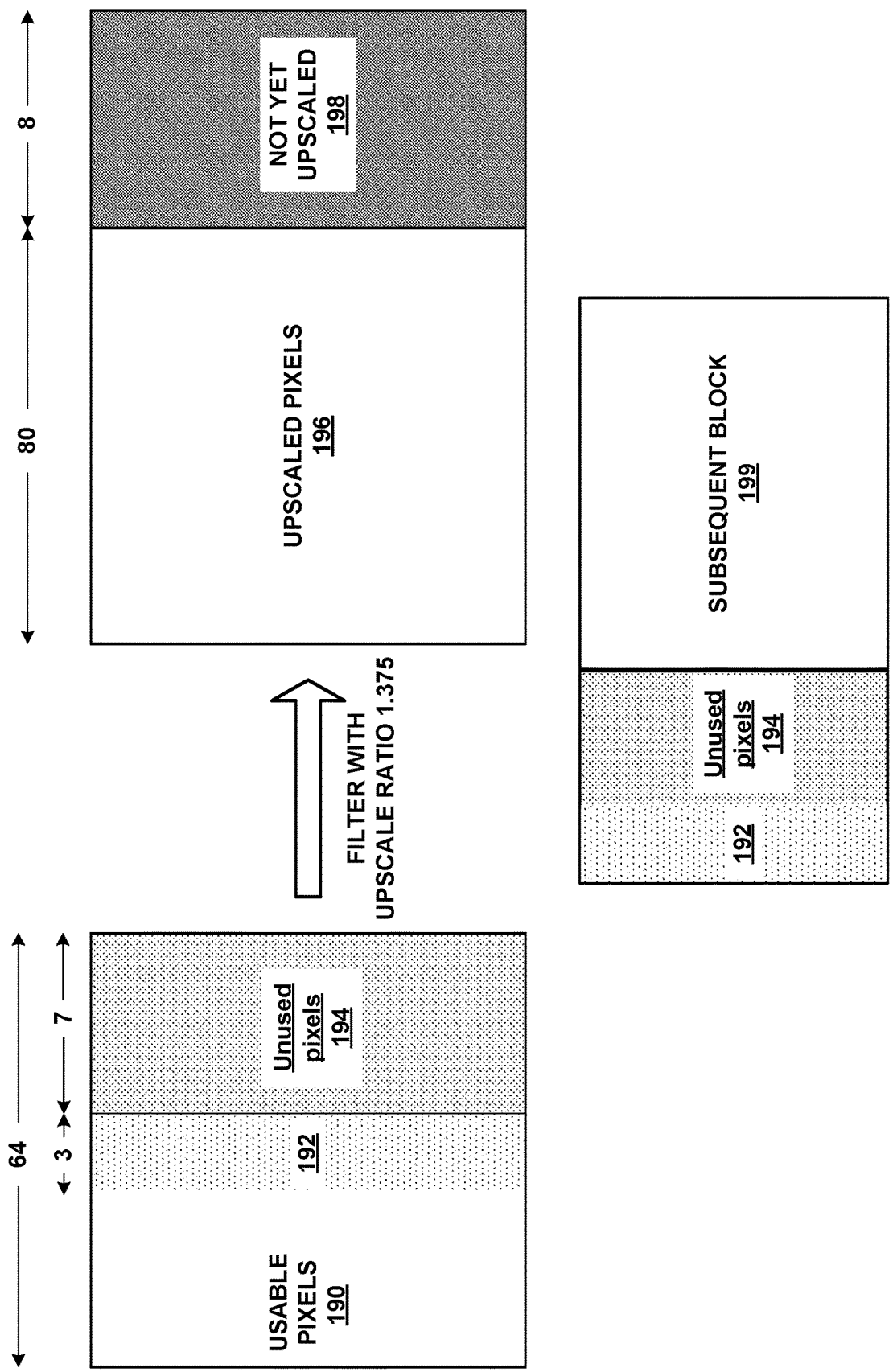
FIG. 8 is a conceptual diagram illustrating an example technique for upscale filtering a block of video data according to the techniques of this disclosure.

FIG. 8 is a conceptual diagram illustrating an example technique for upscale filtering a block of video data according to the techniques of this disclosure. In this example, rather than generating unaligned upscaled pixels (such as unaligned pixels 178 of FIG. 7), only those pixels needed to form aligned upscaled pixels are originally used. That is, a number of upscaled pixels is formed that is equal to a multiple of four (in this example, or more generally, half of the filter width) without exceeding the final upscaled block width. Thus, for an upscale filter with an upscale ratio of 1.375, 80 columns of pixels may be generated from, e.g., 58 central pixels of the original block. That is, upscaled pixels 196 may include 80 columns of pixels, generated from usable pixels 190. This results in 8 columns of not yet upscaled pixels 198, which may be subsequently generated from neighboring pixels 192 and unused pixels 194, along with subsequent block 199.

Thus, assuming each 4×4 block takes n cycles for processing, according to the techniques of this disclosure:

$$\text{Downscale width} = DWwidth$$

$$\text{Upscale width} = UPwidth = DWwidth * UpscaleRatio$$

$$\text{No. of SB blocks in luma frame width} = NumSB = DWwidth/SBWidth$$

$$\text{No. of SB block boundaries} = (NumSB - 1) = (DWwidth/SBWidth - 1)$$

$$\text{No. of } 4 \times 4 \text{ in luma frame height} = FrameHeight/4$$

$$\text{No. of luma } 4 \times 4 \text{ at SB Boundaries} = (NumSB - 1) * \frac{FrameHeight}{4} =$$
$$\left(\frac{DWwidth * UpscaleRatio}{SBWidth} - 1\right) * \frac{FrameHeight}{4}$$

$$\text{No. of } 4 \times 4 \text{ in luma frame height} = \frac{UPwidth}{4} = \frac{DWwidth * UpscaleRatio}{4}$$

Total luma 4×4 blocks =

$$NumLuma = \frac{DWwidth * UpscaleRatio}{4} * \frac{FrameHeight}{4}$$

Total cycles taken for luma processing =

$$\left(\frac{(DWwidth * UpscaleRatio)}{4} * \frac{FrameHeight}{4}\right) * n$$

Total cycles taken for chroma processing =

$$\left(\frac{(DWwidth * UpscaleRatio)}{8} * \frac{FrameHeight}{8}\right) * n$$

Total cycles taken for frame processing =

$$\left(\frac{3 * (DWwidth * UpscaleRatio)}{8} * \frac{FrameHeight}{4}\right) * n$$

Performance Improvement =

$$\frac{\left(\left(\left(\frac{DWwidth}{SBWidth} - 1\right) * \frac{FrameHeight}{2}\right)\right)}{\left(\frac{3 * (DWwidth * UpscaleRatio)}{8} * \frac{FrameHeight}{4}\right) + \left(\left(\frac{DWwidth}{SBWidth} - 1\right) * \frac{FrameHeight}{2}\right)}$$

Figure 9:
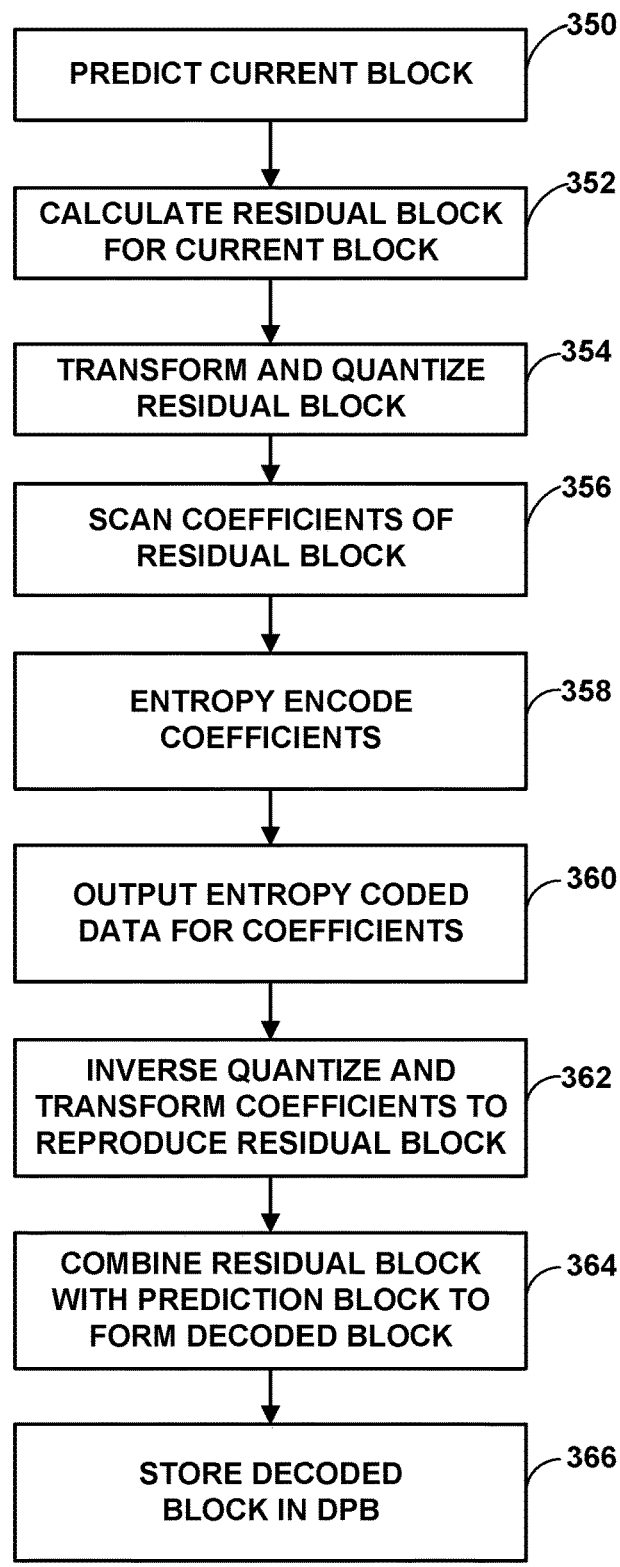
FIG. 9 is a flowchart illustrating an example method for encoding a current block in accordance with the techniques of this disclosure.

FIG. 9 is a flowchart illustrating an example method for encoding a current block in accordance with the techniques of this disclosure. The current block may comprise a current CU. Although described with respect to video encoder 200 (FIGS. 1 and 3), it should be understood that other devices may be configured to perform a method similar to that of FIG. 9.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366). After decoding the block, video encoder 200 or a post-processing unit may perform the techniques of this disclosure to upscale filter the block.

Figure 10:
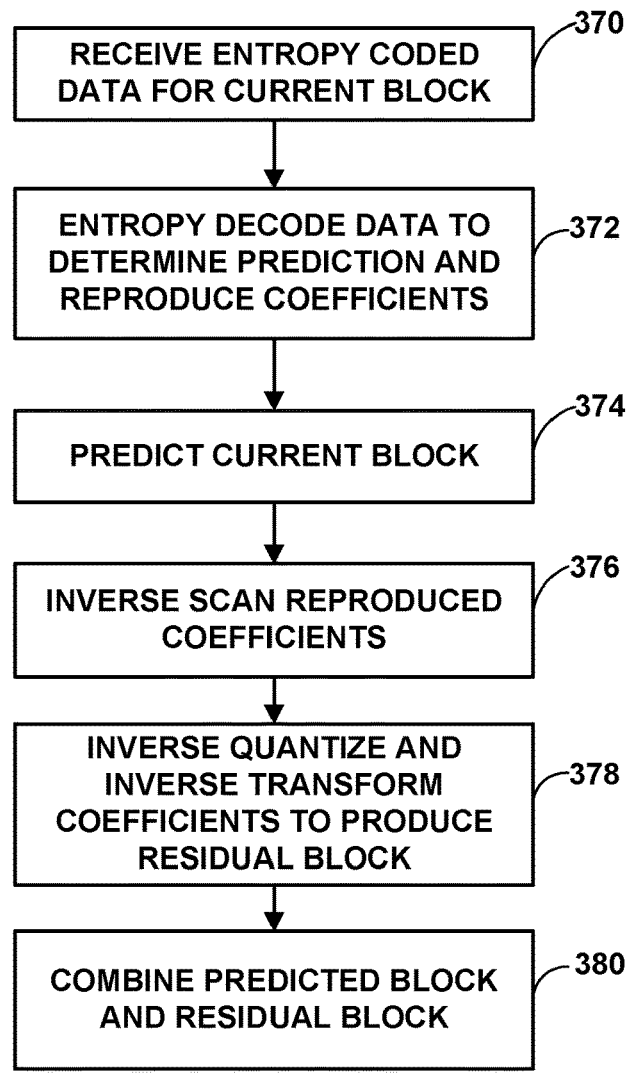
FIG. 10 is a flowchart illustrating an example method for decoding a current block in accordance with the techniques of this disclosure.

FIG. 10 is a flowchart illustrating an example method for decoding a current block of video data in accordance with the techniques of this disclosure. The current block may comprise a current CU. Although described with respect to video decoder 300 (FIGS. 1 and 4), it should be understood that other devices may be configured to perform a method similar to that of FIG. 10.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380). After decoding the block, video decoder 300 or a post-processing unit may perform the techniques of this disclosure to upscale filter the block.

Figure 11:
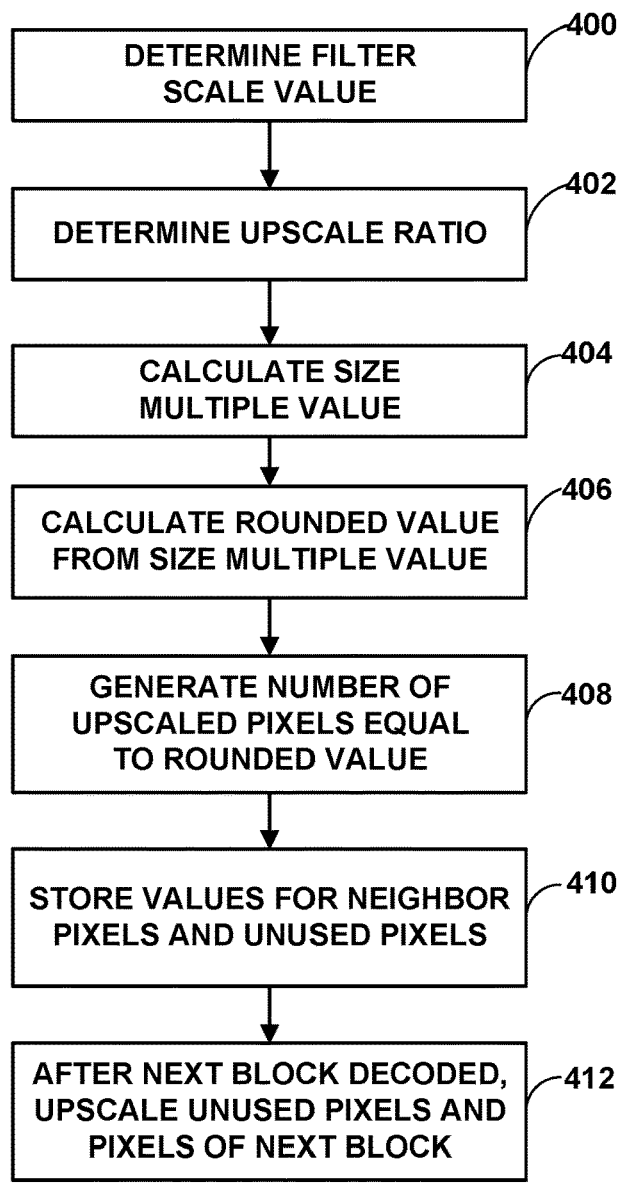
FIG. 11 is a flowchart illustrating an example method of upscale filtering blocks of video data according to the techniques of this disclosure.

FIG. 11 is a flowchart illustrating an example method of upscale filtering blocks of video data according to the techniques of this disclosure. The method of FIG. 11 is explained with respect to upscale filter unit 148 of FIG. 5. This or a similar method may be performed by upscale filter unit 322 of FIG. 4, upscale filter unit 228 of FIG. 3, or a post-processing unit separate from video encoder 200 or video decoder 300.

Initially, upscale filter unit 148 receives a block of decoded video data. Upscale filter unit 148 determines a filter scale value (400), which represents one half of a number of support pixels to be used by the upscale filter to upscale filter the block of decoded video data. The filter scale value may, additionally or alternatively, correspond to a fixed unit number of pixels that is processed by filter kernels 156, e.g., four pixels.

Upscale filter unit 148 may also determine an upscale ratio (402). The upscale ratio may be determined by configuration data provided to upscale filter unit 148. In some examples, the configuration data may be provided by a user. In some examples, the configuration data may be provided in a bitstream including the encoded video data, such as in a supplemental enhancement information (SEI) message or other high level signaling data. The upscale ratio may be determined from a set of available upscale ratios, such as 1.125, 1.25, 1.375, 1.5, 1.625, 1.75, 1.875, and 2.

Upscale filter unit 148 may then calculate a size multiple value (404). The size multiple value may correspond to the product of the upscale ratio and a difference between a size of the block and the filter scale value. That is, if the upscale ratio is R, the size of the block is S, and the filter scale value is FS, then the multiple value may be calculated according to R*(S−FS). Thus, for example, if the upscale ratio is 1.375, the block size is 64, and the filter scale value is 4, the multiple value would be 1.375*60=83.

Upscale filter unit 148 may further calculate a rounded value from the size multiple value (406). The rounded value may be a largest possible integer multiple of the filter scale value that does not exceed the size multiple value. For example, if the filter scale value is 4 and the multiple value is 83, the rounded value would be 80.

Upscale filter unit 148 may then generate a number of upscaled pixels for each row of the block that is equal to the rounded value (408). In particular, upscale filter unit 148 may only generate that number of upscaled pixels for the block at this time (before the right-neighboring block has been decoded), without generating upscaled pixels for a number of pixels from a right edge of the block equal to a difference between the product of the size of the block and the upscale ratio and the rounded value. Thus, if the size of the block is 64, the upscale ratio is 1.375, and the rounded value is 80, the number of upscaled pixels that would not be generated would be equal to 8 ((64*1.375)−80).

Upscale filter unit 148 may then store values for neighboring pixels to the unused pixels and the unused pixels themselves (410). For example, if the unused pixels include seven columns of pixels and the neighboring pixels include three columns of pixels (assuming the upscale filter is an 8-tap filter), ten columns of pixels may be stored for each row. After a next block has been decoded (i.e., a right-neighboring block to the current block), upscale filter unit 148 may upscale the unused pixels and the pixels of the next block (412) using the same method.

In this manner, the method of FIG. 11 represents an example of a method of upscale filtering video data, including determining a filter scale value representing one half of a number of support pixels to be used by an upscale filter to upscale filter a block of video data; determining an upscale ratio for the block of video data; calculating a size multiple value as a product of the upscale ratio and a difference between a size of the block of video data and the filter scale value; calculating a rounded value from the size multiple value such that the rounded value is a largest integer multiple of the filter scale value that does not exceed the size multiple value; generating a number of upscaled pixels for each row of the block of video data that is equal to the rounded value, without generating upscaled pixels for a number of pixels from a right edge of the video block equal to a difference between a product of the size of the block and the upscale ratio and the rounded value; storing values for the number of pixels from the right edge of the video block of video data for each row of the block of video data; and using the stored values for the number of pixels from the right edge of the video block to upscale filter pixels of a right-neighboring block of video data to the block of video data.

Certain examples of the techniques of this disclosure are summarized in the following clauses:

Clause 1: A method of upscale filtering video data, the method comprising: determining a filter scale value representing one half of a number of support pixels to be used by an upscale filter to upscale filter a block of video data; determining an upscale ratio for the block of video data; calculating a size multiple value as a product of the upscale ratio and a difference between the size of the block of video data and the filter scale value; calculating a rounded value from the size multiple value such that the rounded value is a largest integer multiple of the filter scale value that does not exceed the size multiple value; generating a number of upscaled pixels for each row of the block of video data that is equal to the rounded value, without generating upscaled pixels for a number of pixels from a right edge of the video block equal to a difference between a product of the size of the block and the upscale ratio and the rounded value; storing values for the number of pixels from the right edge of the video block of video data for each row of the block of video data; and using the stored values for the number of pixels from the right edge of the video block to upscale filter pixels of a right-neighboring block of video data to the block of video data.

Clause 2: The method of clause 1, wherein the filter scale value is a value of 4.

Clause 3: The method of clause 1, wherein the upscale ratio is selected from a set of upscale ratios including 1.125, 1.25, 1.375, 1.5, 1.625, 1.75, 1.875, and 2.

Clause 4: The method of clause 1, wherein the size of the block of video data is one of 64 pixels or 128 pixels.

Clause 5: The method of clause 1, wherein the rounded value is one of 64, 72, 80, 88, 96, 104, 112, or 120.

Clause 6: The method of clause 1, wherein the number of pixels from the right edge of the video block is one less than the filter scale value.

Clause 7: The method of clause 1, wherein: the number of support pixels is 8, the filter scale value is 4, the size of the block of video data is 64, the upscale ratio is selected from a set of upscale ratios including 1.125, 1.25, 1.375, 1.5, 1.625, 1.75, 1.875, and 2, when the upscale ratio is 1.125, the rounded value is 64, when the upscale ratio is 1.25, the rounded value is 72, when the upscale ratio is 1.375, the rounded value is 80, when the upscale ratio is 1.5, the rounded value is 88, when the upscale ratio is 1.625, the rounded value is 96, when the upscale ratio is 1.75, the rounded value is 104, when the upscale ratio is 1.875, the rounded value is 112, or when the upscale ratio is 2, the rounded value is 120, and wherein the number of pixels from the right edge of the video block is 3.

Clause 8: The method of clause 1, further comprising decoding an encoded block to form the block of video data.

Clause 9: The method of clause 8, further comprising decoding an encoded version of the right-neighboring block after generating the number of upscaled pixels for each row of the block.

Clause 10: The method of clause 1, further comprising: encoding a raw block to form an encoded block; and decoding the encoded block to form the block of video data.

Clause 11: A device for upscale filtering video data, the device comprising: a memory configured to store video data; and one or more processors implemented in circuitry and configured to: determine a filter scale value representing one half of a number of support pixels to be used by an upscale filter to upscale filter a block of video data; determine an upscale ratio for the block of video data; calculate a size multiple value as a product of the upscale ratio and a difference between the size of the block of video data and the filter scale value; calculate a rounded value from the size multiple value such that the rounded value is a largest integer multiple of the filter scale value that does not exceed the size multiple value; generate a number of upscaled pixels for each row of the block of video data that is equal to the rounded value, without generating upscaled pixels for a number of pixels from a right edge of the video block equal to a difference between a product of the size of the block and the upscale ratio and the rounded value; store values for the number of pixels from the right edge of the video block of video data for each row of the block of video data; and use the stored values for the number of pixels from the right edge of the video block to upscale filter pixels of a right-neighboring block of video data to the block of video data.

Clause 12: The device of clause 11, wherein the filter scale value is a value of 4.

Clause 13: The device of clause 11, wherein the upscale ratio is selected from a set of upscale ratios including 1.125, 1.25, 1.375, 1.5, 1.625, 1.75, 1.875, and 2.

Clause 14: The device of clause 11, wherein the size of the block of video data is one of 64 pixels or 128 pixels.

Clause 15: The device of clause 11, wherein the rounded value is one of 64, 72, 80, 88, 96, 104, 112, or 120.

Clause 16: The device of clause 11, wherein the number of pixels from the right edge of the video block is one less than the filter scale value.

Clause 17: The device of clause 11, wherein: the number of support pixels is 8, the filter scale value is 4, the size of the block of video data is 64, the upscale ratio is selected from a set of upscale ratios including 1.125, 1.25, 1.375, 1.5, 1.625, 1.75, 1.875, and 2, when the upscale ratio is 1.125, the rounded value is 64, when the upscale ratio is 1.25, the rounded value is 72, when the upscale ratio is 1.375, the rounded value is 80, when the upscale ratio is 1.5, the rounded value is 88, when the upscale ratio is 1.625, the rounded value is 96, when the upscale ratio is 1.75, the rounded value is 104, when the upscale ratio is 1.875, the rounded value is 112, or when the upscale ratio is 2, the rounded value is 120, and wherein the number of pixels from the right edge of the video block is 3.

Clause 18: The device of clause 11, wherein the one or more processors are further configured to decode an encoded block to form the block of video data.

Clause 19: The device of clause 18, wherein the one or more processors are further configured to decode an encoded version of the right-neighboring block after generating the number of upscaled pixels for each row of the block.

Clause 20: The device of clause 11, wherein the one or more processors are further configured to: encode a raw block to form an encoded block; and decode the encoded block to form the block of video data.

Clause 21: The device of clause 11, wherein the device comprises one or more of a camera, a computer, a mobile device, a broadcast receiver device, or a set-top box.

Clause 22: A computer-readable storage medium having stored thereon instructions that, when executed, cause a processor to: determine a filter scale value representing one half of a number of support pixels to be used by an upscale filter to upscale filter a block of video data; determine an upscale ratio for the block of video data; calculate a size multiple value as a product of the upscale ratio and a difference between the size of the block of video data and the filter scale value; calculate a rounded value from the size multiple value such that the rounded value is a largest integer multiple of the filter scale value that does not exceed the size multiple value; generate a number of upscaled pixels for each row of the block of video data that is equal to the rounded value, without generating upscaled pixels for a number of pixels from a right edge of the video block equal to a difference between a product of the size of the block and the upscale ratio and the rounded value; store values for the number of pixels from the right edge of the video block of video data for each row of the block of video data; and use the stored values for the number of pixels from the right edge of the video block to upscale filter pixels of a right-neighboring block of video data to the block of video data.

Clause 23: The computer-readable storage medium of clause 22, wherein the filter scale value is a value of 4.

Clause 24: The computer-readable storage medium of clause 22, wherein the upscale ratio is selected from a set of upscale ratios including 1.125, 1.25, 1.375, 1.5, 1.625, 1.75, 1.875, and 2.

Clause 25: The computer-readable storage medium of clause 22, wherein the size of the block of video data is one of 64 pixels or 128 pixels.

Clause 26: The computer-readable storage medium of clause 22, wherein the rounded value is one of 64, 72, 80, 88, 96, 104, 112, or 120.

Clause 27: The computer-readable storage medium of clause 22, wherein the number of pixels from the right edge of the video block is one less than the filter scale value.

Clause 28: The computer-readable storage medium of clause 22, wherein: the number of support pixels is 8, the filter scale value is 4, the size of the block of video data is 64, the upscale ratio is selected from a set of upscale ratios including 1.125, 1.25, 1.375, 1.5, 1.625, 1.75, 1.875, and 2, when the upscale ratio is 1.125, the rounded value is 64, when the upscale ratio is 1.25, the rounded value is 72, when the upscale ratio is 1.375, the rounded value is 80, when the upscale ratio is 1.5, the rounded value is 88, when the upscale ratio is 1.625, the rounded value is 96, when the upscale ratio is 1.75, the rounded value is 104, when the upscale ratio is 1.875, the rounded value is 112, or when the upscale ratio is 2, the rounded value is 120, and wherein the number of pixels from the right edge of the video block is 3.

Clause 29: The computer-readable storage medium of clause 22, further comprising instructions that cause the processor to decode an encoded block to form the block of video data.

Clause 30: The computer-readable storage medium of clause 22, wherein the one or more processors are further configured to: encode a raw block to form an encoded block; and decode the encoded block to form the block of video data.

Clause 31: A device for upscale filtering video data, the device comprising: means for determining a filter scale value representing one half of a number of support pixels to be used by an upscale filter to upscale filter a block of video data; means for determining an upscale ratio for the block of video data; means for calculating a size multiple value as a product of the upscale ratio and a difference between the size of the block of video data and the filter scale value; means for calculating a rounded value from the size multiple value such that the rounded value is a largest integer multiple of the filter scale value that does not exceed the size multiple value; means for generating a number of upscaled pixels for each row of the block of video data that is equal to the rounded value, without generating upscaled pixels for a number of pixels from a right edge of the video block equal to a difference between a product of the size of the block and the upscale ratio and the rounded value; means for storing values for the number of pixels from the right edge of the video block of video data for each row of the block of video data; and means for using the stored values for the number of pixels from the right edge of the video block to upscale filter pixels of a right-neighboring block of video data to the block of video data.

Clause 32: A method of upscale filtering video data, the method comprising: determining a filter scale value representing one half of a number of support pixels to be used by an upscale filter to upscale filter a block of video data; determining an upscale ratio for the block of video data; calculating a size multiple value as a product of the upscale ratio and a difference between the size of the block of video data and the filter scale value; calculating a rounded value from the size multiple value such that the rounded value is a largest integer multiple of the filter scale value that does not exceed the size multiple value; generating a number of upscaled pixels for each row of the block of video data that is equal to the rounded value, without generating upscaled pixels for a number of pixels from a right edge of the video block equal to a difference between a product of the size of the block and the upscale ratio and the rounded value; storing values for the number of pixels from the right edge of the video block of video data for each row of the block of video data; and using the stored values for the number of pixels from the right edge of the video block to upscale filter pixels of a right-neighboring block of video data to the block of video data.

Clause 33: The method of clause 32, wherein the filter scale value is a value of 4.

Clause 34: The method of any of clauses 32 and 33, wherein the upscale ratio is selected from a set of upscale ratios including 1.125, 1.25, 1.375, 1.5, 1.625, 1.75, 1.875, and 2.

Clause 35: The method of any of clauses 32-34, wherein the size of the block of video data is one of 64 pixels or 128 pixels.

Clause 36: The method of any of clauses 32-35, wherein the rounded value is one of 64, 72, 80, 88, 96, 104, 112, or 120.

Clause 37: The method any of clauses 32-36, wherein the number of pixels from the right edge of the video block is one less than the filter scale value.

Clause 38: The method of clause 1, wherein: the number of support pixels is 8, the filter scale value is 4, the size of the block of video data is 64, the upscale ratio is selected from a set of upscale ratios including 1.125, 1.25, 1.375, 1.5, 1.625, 1.75, 1.875, and 2, when the upscale ratio is 1.125, the rounded value is 64, when the upscale ratio is 1.25, the rounded value is 72, when the upscale ratio is 1.375, the rounded value is 80, when the upscale ratio is 1.5, the rounded value is 88, when the upscale ratio is 1.625, the rounded value is 96, when the upscale ratio is 1.75, the rounded value is 104, when the upscale ratio is 1.875, the rounded value is 112, or when the upscale ratio is 2, the rounded value is 120, and wherein the number of pixels from the right edge of the video block is 3.

Clause 39: The method of any of clauses 32-38, further comprising decoding an encoded block to form the block of video data.

Clause 40: The method of clause 39, further comprising decoding an encoded version of the right-neighboring block after generating the number of upscaled pixels for each row of the block.

Clause 41: The method of any of clauses 32-40, further comprising: encoding a raw block to form an encoded block; and decoding the encoded block to form the block of video data.

Clause 42: A device for upscale filtering video data, the device comprising: a memory configured to store video data; and one or more processors implemented in circuitry and configured to: determine a filter scale value representing one half of a number of support pixels to be used by an upscale filter to upscale filter a block of video data; determine an upscale ratio for the block of video data; calculate a size multiple value as a product of the upscale ratio and a difference between the size of the block of video data and the filter scale value; calculate a rounded value from the size multiple value such that the rounded value is a largest integer multiple of the filter scale value that does not exceed the size multiple value; generate a number of upscaled pixels for each row of the block of video data that is equal to the rounded value, without generating upscaled pixels for a number of pixels from a right edge of the video block equal to a difference between a product of the size of the block and the upscale ratio and the rounded value; store values for the number of pixels from the right edge of the video block of video data for each row of the block of video data; and use the stored values for the number of pixels from the right edge of the video block to upscale filter pixels of a right-neighboring block of video data to the block of video data.

Clause 43: The device of clause 42, wherein the filter scale value is a value of 4.

Clause 44: The device of any of clauses 42 and 43, wherein the upscale ratio is selected from a set of upscale ratios including 1.125, 1.25, 1.375, 1.5, 1.625, 1.75, 1.875, and 2.

Clause 45: The device of any of clauses 42-44, wherein the size of the block of video data is one of 64 pixels or 128 pixels.

Clause 46: The device of any of clauses 42-45, wherein the rounded value is one of 64, 72, 80, 88, 96, 104, 112, or 120.

Clause 47: The device of any of clauses 42-46, wherein the number of pixels from the right edge of the video block is one less than the filter scale value.

Clause 48: The device of clause 11, wherein: the number of support pixels is 8, the filter scale value is 4, the size of the block of video data is 64, the upscale ratio is selected from a set of upscale ratios including 1.125, 1.25, 1.375, 1.5, 1.625, 1.75, 1.875, and 2, when the upscale ratio is 1.125, the rounded value is 64, when the upscale ratio is 1.25, the rounded value is 72, when the upscale ratio is 1.375, the rounded value is 80, when the upscale ratio is 1.5, the rounded value is 88, when the upscale ratio is 1.625, the rounded value is 96, when the upscale ratio is 1.75, the rounded value is 104, when the upscale ratio is 1.875, the rounded value is 112, or when the upscale ratio is 2, the rounded value is 120, and wherein the number of pixels from the right edge of the video block is 3.

Clause 49: The device of any of clauses 42-48, wherein the one or more processors are further configured to decode an encoded block to form the block of video data.

Clause 50: The device of clause 49, wherein the one or more processors are further configured to decode an encoded version of the right-neighboring block after generating the number of upscaled pixels for each row of the block.

Clause 51: The device of any of clauses 42-50, wherein the one or more processors are further configured to: encode a raw block to form an encoded block; and decode the encoded block to form the block of video data.

Clause 52: The device of any of clauses 42-51, wherein the device comprises one or more of a camera, a computer, a mobile device, a broadcast receiver device, or a set-top box.

Clause 53: A computer-readable storage medium having stored thereon instructions that, when executed, cause a processor to: determine a filter scale value representing one half of a number of support pixels to be used by an upscale filter to upscale filter a block of video data; determine an upscale ratio for the block of video data; calculate a size multiple value as a product of the upscale ratio and a difference between the size of the block of video data and the filter scale value; calculate a rounded value from the size multiple value such that the rounded value is a largest integer multiple of the filter scale value that does not exceed the size multiple value; generate a number of upscaled pixels for each row of the block of video data that is equal to the rounded value, without generating upscaled pixels for a number of pixels from a right edge of the video block equal to a difference between a product of the size of the block and the upscale ratio and the rounded value; store values for the number of pixels from the right edge of the video block of video data for each row of the block of video data; and use the stored values for the number of pixels from the right edge of the video block to upscale filter pixels of a right-neighboring block of video data to the block of video data.

Clause 54: The computer-readable storage medium of clause 53, wherein the filter scale value is a value of 4.

Clause 55: The computer-readable storage medium of any of clauses 53 and 54, wherein the upscale ratio is selected from a set of upscale ratios including 1.125, 1.25, 1.375, 1.5, 1.625, 1.75, 1.875, and 2.

Clause 56: The computer-readable storage medium of any of clauses 53-55, wherein the size of the block of video data is one of 64 pixels or 128 pixels.

Clause 57: The computer-readable storage medium of any of clauses 53-56, wherein the rounded value is one of 64, 72, 80, 88, 96, 104, 112, or 120.

Clause 58: The computer-readable storage medium of any of clauses 53-57, wherein the number of pixels from the right edge of the video block is one less than the filter scale value.

Clause 59: The computer-readable storage medium of clause 53, wherein: the number of support pixels is 8, the filter scale value is 4, the size of the block of video data is 64, the upscale ratio is selected from a set of upscale ratios including 1.125, 1.25, 1.375, 1.5, 1.625, 1.75, 1.875, and 2, when the upscale ratio is 1.125, the rounded value is 64, when the upscale ratio is 1.25, the rounded value is 72, when the upscale ratio is 1.375, the rounded value is 80, when the upscale ratio is 1.5, the rounded value is 88, when the upscale ratio is 1.625, the rounded value is 96, when the upscale ratio is 1.75, the rounded value is 104, when the upscale ratio is 1.875, the rounded value is 112, or when the upscale ratio is 2, the rounded value is 120, and wherein the number of pixels from the right edge of the video block is 3.

Clause 60: The computer-readable storage medium of any of clauses 53-59, further comprising instructions that cause the processor to decode an encoded block to form the block of video data.

Clause 61: The computer-readable storage medium of any of clauses 53-60, wherein the one or more processors are further configured to: encode a raw block to form an encoded block; and decode the encoded block to form the block of video data.

Clause 62: A device for upscale filtering video data, the device comprising: means for determining a filter scale value representing one half of a number of support pixels to be used by an upscale filter to upscale filter a block of video data; means for determining an upscale ratio for the block of video data; means for calculating a size multiple value as a product of the upscale ratio and a difference between the size of the block of video data and the filter scale value; means for calculating a rounded value from the size multiple value such that the rounded value is a largest integer multiple of the filter scale value that does not exceed the size multiple value; means for generating a number of upscaled pixels for each row of the block of video data that is equal to the rounded value, without generating upscaled pixels for a number of pixels from a right edge of the video block equal to a difference between a product of the size of the block and the upscale ratio and the rounded value; means for storing values for the number of pixels from the right edge of the video block of video data for each row of the block of video data; and means for using the stored values for the number of pixels from the right edge of the video block to upscale filter pixels of a right-neighboring block of video data to the block of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of upscale filtering video data, the method comprising:
   determining a filter scale value representing one half of a number of support pixels to be used by an upscale filter to upscale filter a current block of video data;
   determining an upscale ratio for the current block of video data;
   calculating a size multiple value as a product of the upscale ratio and a difference between a size of the current block of video data and the filter scale value;
   calculating a rounded value from the size multiple value such that the rounded value is a largest integer multiple of the filter scale value that does not exceed the size multiple value;
   generating a number of upscaled pixels for each row of the current block of video data that is equal to the rounded value, without generating upscaled pixels for a number of pixels from a right edge of the current block equal to a difference between a product of the size of the current block and the upscale ratio and the rounded value;
   storing values for the number of pixels from the right edge of the current block of video data for each row of the current block of video data; and using the stored values for the number of pixels from the right edge of the current block to upscale filter pixels of a right-neighboring block of video data to the current block of video data.

2. The method of claim 1, further comprising:
storing unprocessed values for pixels of the current block to the left of the number of pixels from the right edge of the current block; and
upscale filtering the number of pixels from the right edge of the current block using the stored unprocessed values for the pixels of the current block.

3. The method of claim 1, wherein the filter scale value is a value of 4.

4. The method of claim 1, wherein the upscale ratio is selected from a set of upscale ratios including 1.125, 1.25, 1.375, 1.5, 1.625, 1.75, 1.875, and 2.

5. The method of claim 1, wherein the size of the current block of video data is one of 64 pixels or 128 pixels.

6. The method of claim 1, wherein the rounded value is one of 64, 72, 80, 88, 96, 104, 112, or 120.

7. The method of claim 1, wherein the number of pixels from the right edge of the current block is one less than the filter scale value.

8. The method of claim 1, wherein:
the number of support pixels is 8,
the filter scale value is 4,
the size of the current block of video data is 64,
the upscale ratio is selected from a set of upscale ratios including 1.125, 1.25, 1.375, 1.5, 1.625, 1.75, 1.875, and 2,
when the upscale ratio is 1.125, the rounded value is 64,
when the upscale ratio is 1.25, the rounded value is 72,
when the upscale ratio is 1.375, the rounded value is 80,
when the upscale ratio is 1.5, the rounded value is 88,
when the upscale ratio is 1.625, the rounded value is 96,
when the upscale ratio is 1.75, the rounded value is 104,
when the upscale ratio is 1.875, the rounded value is 112, or
when the upscale ratio is 2, the rounded value is 120, and
wherein the number of pixels from the right edge of the current block is 3.

9. The method of claim 1, further comprising decoding an encoded block to form the current block of video data.

10. The method of claim 9, further comprising decoding an encoded version of the right-neighboring block after generating the number of upscaled pixels for each row of the current block.

11. The method of claim 1, further comprising:
encoding a raw block to form an encoded block; and
decoding the encoded block to form the current block of video data.

12. A device for upscale filtering video data, the device comprising:
a memory configured to store video data; and
one or more processors implemented in circuitry and configured to:
determine a filter scale value representing one half of a number of support pixels to be used by an upscale filter to upscale filter a current block of video data;
determine an upscale ratio for the current block of video data;
calculate a size multiple value as a product of the upscale ratio and a difference between the size of the current block of video data and the filter scale value;
calculate a rounded value from the size multiple value such that the rounded value is a largest integer multiple of the filter scale value that does not exceed the size multiple value;
generate a number of upscaled pixels for each row of the current block of video data that is equal to the rounded value, without generating upscaled pixels for a number of pixels from a right edge of the current block equal to a difference between a product of the size of the current block and the upscale ratio and the rounded value;
store values for the number of pixels from the right edge of the current block of video data for each row of the current block of video data; and
use the stored values for the number of pixels from the right edge of the current block to upscale filter pixels of a right-neighboring block of video data to the current block of video data.

13. The device of claim 12, wherein the one or more processors are further configured to:
store unprocessed values for pixels of the current block to the left of the number of pixels from the right edge of the current block; and
upscale filter the number of pixels from the right edge of the current block using the stored unprocessed values for the pixels of the current block.

14. The device of claim 12, wherein the filter scale value is a value of 4.

15. The device of claim 12, wherein the upscale ratio is selected from a set of upscale ratios including 1.125, 1.25, 1.375, 1.5, 1.625, 1.75, 1.875, and 2.

16. The device of claim 12, wherein the size of the current block of video data is one of 64 pixels or 128 pixels.

17. The device of claim 12, wherein the rounded value is one of 64, 72, 80, 88, 96, 104, 112, or 120.

18. The device of claim 12, wherein the number of pixels from the right edge of the current block is one less than the filter scale value.

19. The device of claim 12, wherein:
the number of support pixels is 8,
the filter scale value is 4,
the size of the current block of video data is 64,
the upscale ratio is selected from a set of upscale ratios including 1.125, 1.25, 1.375, 1.5, 1.625, 1.75, 1.875, and 2,
when the upscale ratio is 1.125, the rounded value is 64,
when the upscale ratio is 1.25, the rounded value is 72,
when the upscale ratio is 1.375, the rounded value is 80,
when the upscale ratio is 1.5, the rounded value is 88,
when the upscale ratio is 1.625, the rounded value is 96,
when the upscale ratio is 1.75, the rounded value is 104,
when the upscale ratio is 1.875, the rounded value is 112, or
when the upscale ratio is 2, the rounded value is 120, and
wherein the number of pixels from the right edge of the current block is 3.

20. The device of claim 12, wherein the one or more processors are further configured to decode an encoded block to form the current block of video data.

21. The device of claim 20, wherein the one or more processors are further configured to decode an encoded version of the right-neighboring block after generating the number of upscaled pixels for each row of the current block.

22. The device of claim 12, wherein the one or more processors are further configured to:
encode a raw block to form an encoded block; and decode the encoded block to form the current block of video data.

23. The device of claim 12, wherein the device comprises one or more of a camera, a computer, a mobile device, a broadcast receiver device, or a set-top box.

24. A non-transitory computer-readable storage medium having stored thereon instructions that, when executed, cause a processor to:
determine a filter scale value representing one half of a number of support pixels to be used by an upscale filter to upscale filter a current block of video data;
determine an upscale ratio for the current block of video data;
calculate a size multiple value as a product of the upscale ratio and a difference between the size of the current block of video data and the filter scale value;
calculate a rounded value from the size multiple value such that the rounded value is a largest integer multiple of the filter scale value that does not exceed the size multiple value;
generate a number of upscaled pixels for each row of the current block of video data that is equal to the rounded value, without generating upscaled pixels for a number of pixels from a right edge of the current block equal to a difference between a product of the size of the current block and the upscale ratio and the rounded value;
store values for the number of pixels from the right edge of the current block of video data for each row of the current block of video data; and
use the stored values for the number of pixels from the right edge of the current block to upscale filter pixels of a right-neighboring block of video data to the current block of video data.

25. The non-transitory computer-readable storage medium of claim 24, further comprising instructions that cause the processor to:
store unprocessed values for pixels of the current block to the left of the number of pixels from the right edge of the current block; and
upscale filter the number of pixels from the right edge of the current block using the stored unprocessed values for the pixels of the current block.

26. The non-transitory computer-readable storage medium of claim 24, wherein the filter scale value is a value of 4.

27. The non-transitory computer-readable storage medium of claim 24, wherein the upscale ratio is selected from a set of upscale ratios including 1.125, 1.25, 1.375, 1.5, 1.625, 1.75, 1.875, and 2.

28. The non-transitory computer-readable storage medium of claim 24, wherein the size of the current block of video data is one of 64 pixels or 128 pixels.

29. The non-transitory computer-readable storage medium of claim 24, wherein the rounded value is one of 64, 72, 80, 88, 96, 104, 112, or 120.

30. The non-transitory computer-readable storage medium of claim 24, wherein the number of pixels from the right edge of the current block is one less than the filter scale value.

31. The non-transitory computer-readable storage medium of claim 24, wherein:
the number of support pixels is 8,
the filter scale value is 4,
the size of the current block of video data is 64,
the upscale ratio is selected from a set of upscale ratios including 1.125, 1.25, 1.375, 1.5, 1.625, 1.75, 1.875, and 2,
when the upscale ratio is 1.125, the rounded value is 64,
when the upscale ratio is 1.25, the rounded value is 72,
when the upscale ratio is 1.375, the rounded value is 80,
when the upscale ratio is 1.5, the rounded value is 88,
when the upscale ratio is 1.625, the rounded value is 96,
when the upscale ratio is 1.75, the rounded value is 104,
when the upscale ratio is 1.875, the rounded value is 112, or
when the upscale ratio is 2, the rounded value is 120, and
wherein the number of pixels from the right edge of the current block is 3.

32. The non-transitory computer-readable storage medium of claim 24, further comprising instructions that cause the processor to decode an encoded block to form the current block of video data.

33. The non-transitory computer-readable storage medium of claim 24, wherein the one or more processors are further configured to:
encode a raw block to form an encoded block; and
decode the encoded block to form the current block of video data.

34. A device for upscale filtering video data, the device comprising:
means for determining a filter scale value representing one half of a number of support pixels to be used by an upscale filter to upscale filter a current block of video data;
means for determining an upscale ratio for the current block of video data;
means for calculating a size multiple value as a product of the upscale ratio and a difference between the size of the current block of video data and the filter scale value;
means for calculating a rounded value from the size multiple value such that the rounded value is a largest integer multiple of the filter scale value that does not exceed the size multiple value;
means for generating a number of upscaled pixels for each row of the current block of video data that is equal to the rounded value, without generating upscaled pixels for a number of pixels from a right edge of the current block equal to a difference between a product of the size of the current block and the upscale ratio and the rounded value;
means for storing values for the number of pixels from the right edge of the current block of video data for each row of the current block of video data; and
means for using the stored values for the number of pixels from the right edge of the current block to upscale filter pixels of a right-neighboring block of video data to the current block of video data.

* * * * *